United States Patent [19]

Kataoka

[11] Patent Number: 5,436,521
[45] Date of Patent: Jul. 25, 1995

[54] VIBRATION TYPE ACTUATOR APPARATUS

[75] Inventor: Kenichi Kataoka, Yokohama, Japan

[73] Assignee: Canon Kabushiki Kaisha, Tokyo, Japan

[21] Appl. No.: 74,666

[22] Filed: Jun. 10, 1993

[30] Foreign Application Priority Data

Jun. 12, 1992 [JP] Japan .................................. 4-153605

[51] Int. Cl.$^6$ ............................................. H01L 41/08
[52] U.S. Cl. .................................................... 310/317
[58] Field of Search .................. 310/316, 317; 318/116

[56] References Cited

U.S. PATENT DOCUMENTS

| | | | |
|---|---|---|---|
| 4,952,834 | 8/1990 | Okada | 310/316 |
| 4,965,481 | 10/1990 | Kashiyama | 310/316 |
| 5,004,964 | 4/1991 | Kataoka et al. | 318/128 |
| 5,013,982 | 5/1991 | Sasaki | 318/116 |
| 5,021,700 | 6/1991 | Takahashi et al. | 310/316 |
| 5,057,734 | 10/1991 | Tsuzuki et al. | 310/317 |
| 5,093,606 | 3/1992 | Adachi et al. | 318/116 |
| 5,136,199 | 8/1992 | Kawai | 310/317 |

FOREIGN PATENT DOCUMENTS 02206373  8/1990  Japan .......................... H02N 2/00

*Primary Examiner*—Thomas M. Dougherty
*Attorney, Agent, or Firm*—Fitzpatrick, Cella, Harper & Scinto

[57] ABSTRACT

A vibration type actuator apparatus which obtains a driving force by applying an AC signal to an electromechanical energy conversion element to generate a vibration force. First and second switching elements are alternately turned on to supply a driving current to the primary coil of a transformer, thereby operating the transformer, and the transformer applies the AC signal to the energy conversion elements. When the two switching elements are simultaneously turned on, the primary coil is short-circuited to immediately consume vibration driving energy when the actuator apparatus is stopped.

14 Claims, 8 Drawing Sheets

F I G. 7
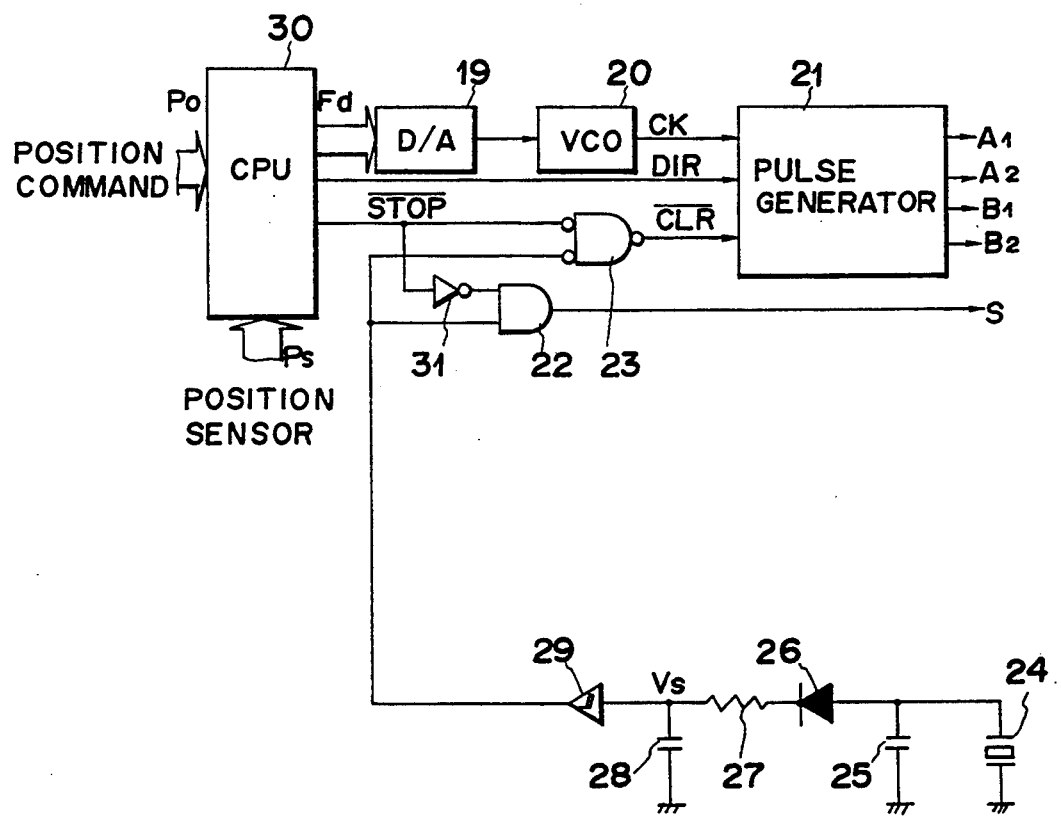

VIBRATION TYPE ACTUATOR APPARATUS

BACKGROUND OF THE INVENTION

1. Field of the Invention

The present invention relates to a driving circuit for a vibration type actuator (vibration wave motor).

1. Related Background Art

Conventionally, in order to stop a vibration type actuator (vibration wave motor), a driving circuit arrangement in which a resistor is connected in parallel with the motor to consume the vibration driving energy as heat energy has been proposed, as disclosed in Japanese Laid-Open Patent Application No. 2-206373.

However, with the above-mentioned proposal, the circuit arrangement becomes complicated, and cost is increased.

SUMMARY OF THE INVENTION

It is an object of the present invention to provide a vibration type motor driving circuit, which has a simple circuit arrangement and low cost.

In, one aspect, the present invention provides an actuator apparatus wherein a transformer having a center tap at its primary side is used, and switching elements are connected to the other-end portions of two coils sandwiching the center tap therebetween and are alternately turned on to generate an AC high voltage at the secondary side of the transformer; A vibration type motor is driven by this voltage, and when the motor is stopped, the two switching elements are simultaneously turned on to immediately consume the vibration driving energy of the vibration type motor.

In another aspect, of the present invention provides a motor, which intermittently performs simultaneous ON operations of the two switching elements.

Other features of the present invention will become apparent from the following description of the embodiments taken in conjunction with the accompanying drawings.

BRIEF DESCRIPTION OF THE DRAWINGS

FIG. 7 is a block diagram showing a second control circuit: for the apparatus shown in FIG. 1;

DESCRIPTION OF THE PREFERRED EMBODIMENTS OF THE INVENTION

The preferred embodiments of the present invention will be described hereinafter with reference to the accompanying drawings.

<First Embodiment>

Figure 1:
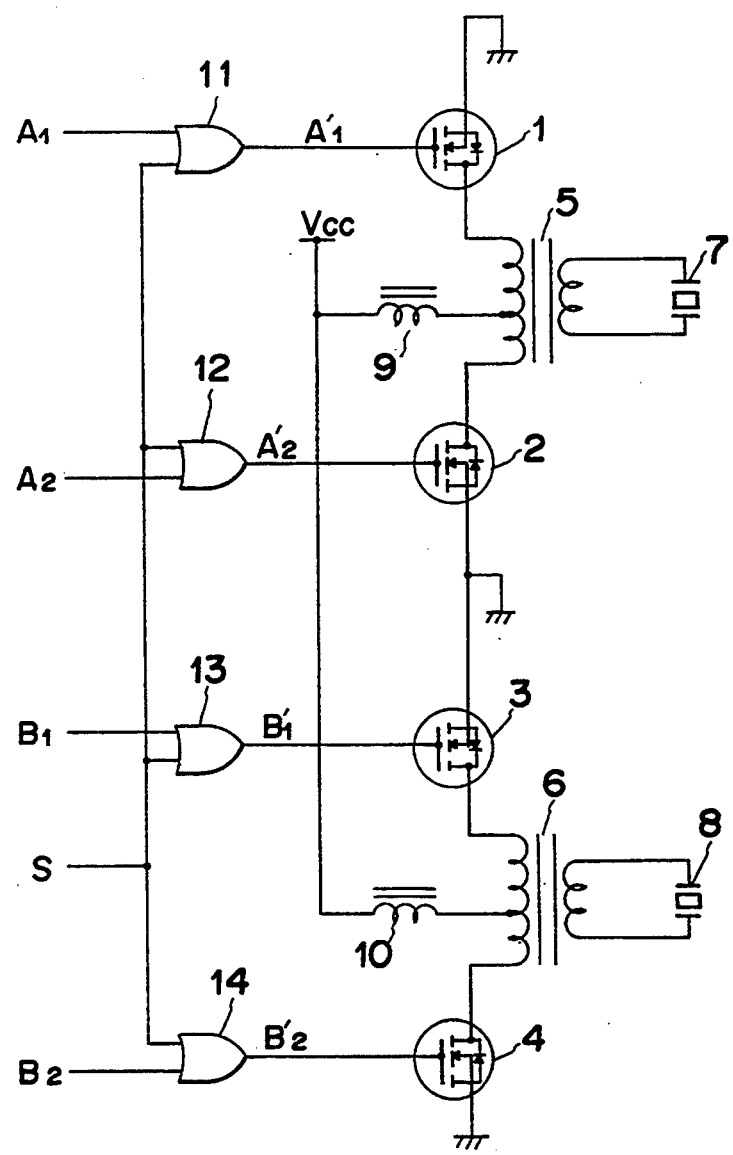
FIG. 1 is a circuit diagram showing an actuator apparatus according to the first embodiment of the present invention.
Figure 2:
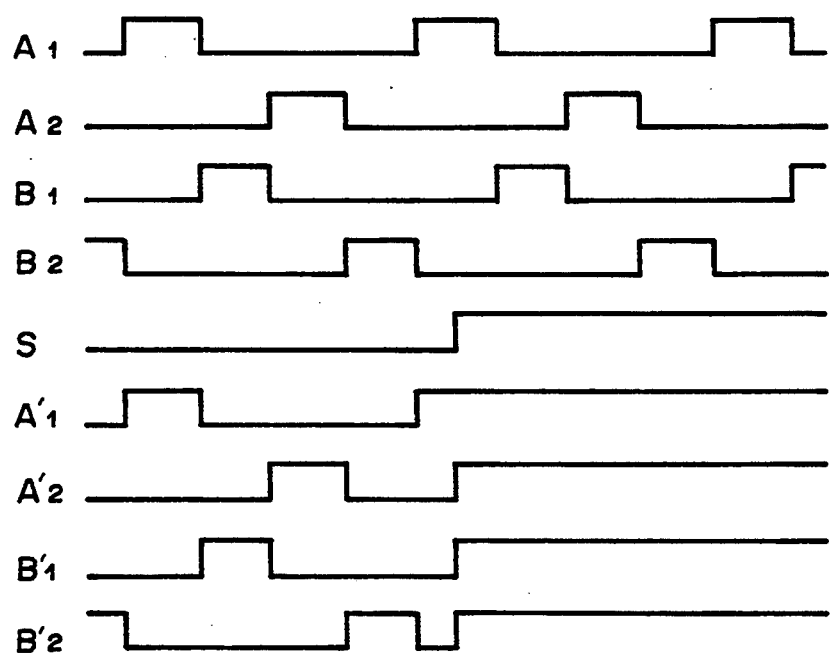
FIG. 2 is a timing chart of the circuit diagram shown in FIG. 1.
Figure 5:
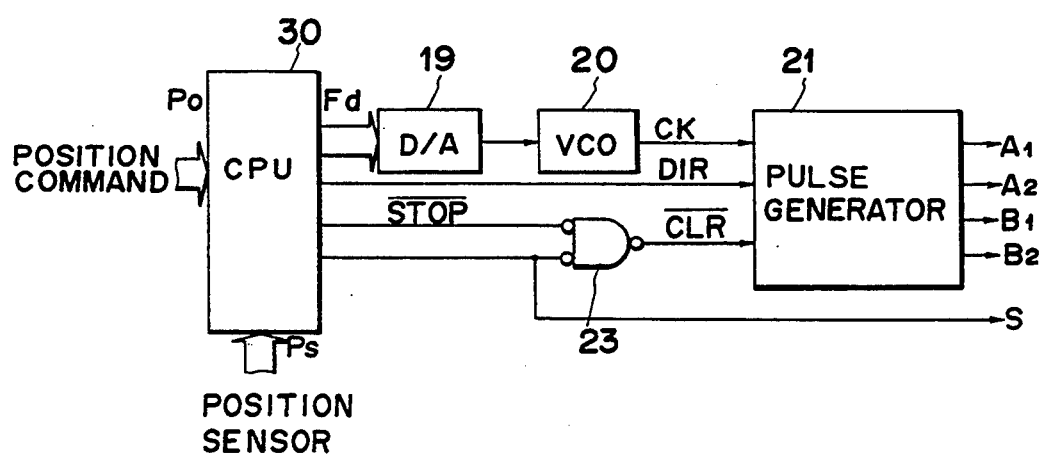
FIG. 5 is a block diagram showing a first control circuit for the apparatus shown in FIG. 1.
Figure 6:
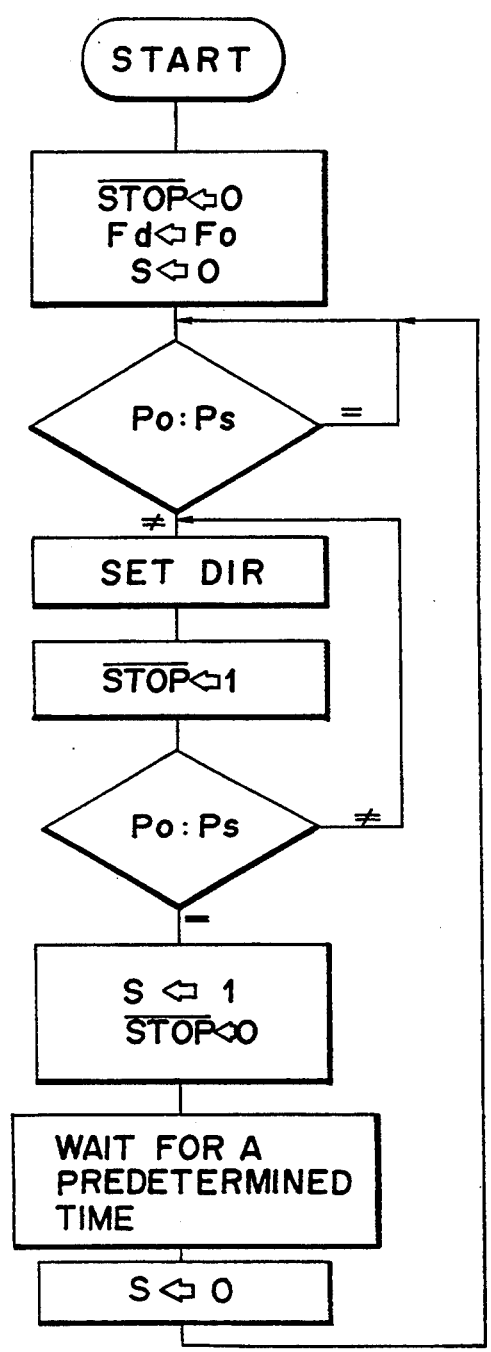
FIG. 6 is a flow chart showing the operation of the circuit; shown in FIG. 5.
Figure 9:
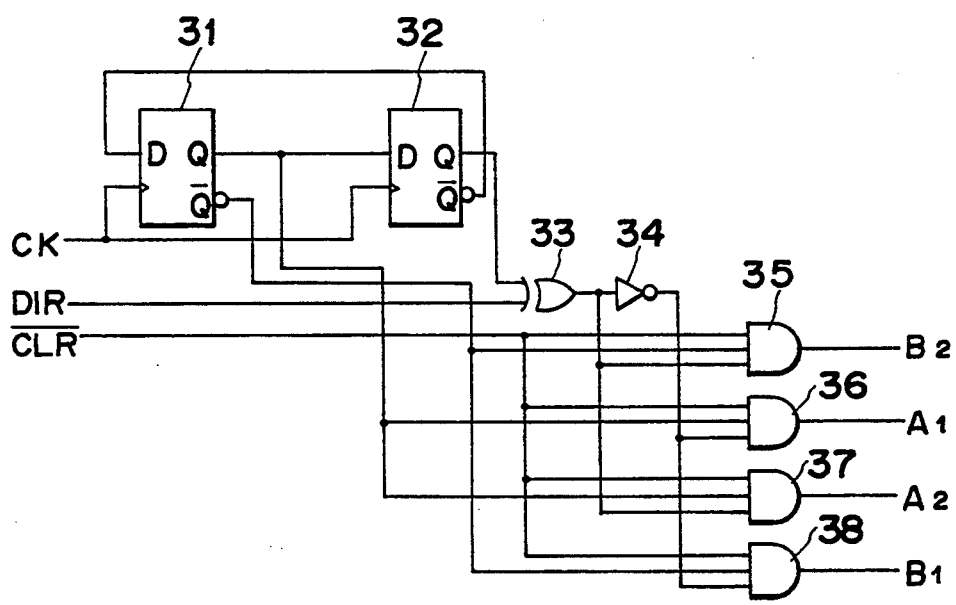
FIG. 9 is a circuit diagram showing a circuit arrangement of a pulse generator.

FIG. 1 is a circuit diagram showing a first embodiment of the present invention. A circuit shown in FIG. 1 includes switching MOSFETs 1, 2, 3, and 4, step-up transformers 5 and 6, driving piezoelectric elements 7 and 8 as electro-mechanical energy conversion elements of a vibration wave motor (as a vibration type actuator), impedance matching choke coils 9 and 10, and OR gates 11, 12, 13, and 14. FIG. 2 shows waveforms of the respective circuit portions. An operation will be briefly described below. When an input signal S goes to Low level, the same signals as input signals $A_1$, $A_2$, $B_1$, and $B_2$ respectively are output from )R gates 11, 12, 13 and 14 as signals $A_1'$, $A_2'$, $B_1'$, and $B_2'$. When the input signal S goes to High level, all the signals $A_1'$, $A_2'$, $B_1'$, and $B_2'$ go to High level. The MOSFETs 1, 2, 3, and 4 are turned on when their gate signals are at High level. For this reason, when the input signal S is at Low level, since the MOSFETs 1 and 2, and the MOSFETs 3 and 4 at the primary sides of the transformers 5 and 6 are alternately turned on, high-frequency voltages are output from the secondary sides of the transformers 5 and 6, and boosted voltages are applied to the piezoelectric elements 7 and 8. When the input signal S is at High level, since all the MOSFETs 1, 2, 3, and 4 are turned on, the primary sides of the transformers 5 and 6 are short-circuited. For this reason, the high-frequency voltages at the secondary sides of the transformers instantaneously become zero, and output voltages from the piezoelectric elements 7 and 8 due to residual vibration are immediately consumed by the circuit, thus stopping the vibration at high speed. FIG. 5 shows an example of a circuit for generating the signals $A_1'$, $A_2'$, $B_1'$, $B_2'$, and S. The circuit shown in FIG. 5 includes a pulse generator 21, a known VCO (voltage-frequency converter) 20, a known D/A converter 19, an OR gate 23, and a CPU 30. FIG. 9 is a circuit diagram showing an arrangement of the pulse generator 21. FIG. 6 is a flow chart showing an operation of the CPU 30 shown in FIG. 5. The operation of the circuit shown in FIG. 5 will be described below with reference to FIG. 6.

When a software program is started, a $\overline{STOP}$ signal is set at Low level, the driving frequency of the vibration wave motor is set in Fd, and the S signal is set at Low level. Then, a voltage indicating a frequency four times the driving frequency is input to the input terminal of the VCO 20 via the D/A converter 19, and a signal CK having a frequency four times the driving frequency is output from the VCO 20.

Since the $\overline{STOP}$ signal and the S signal are at Low level, a $\overline{CLR}$ signal goes to Low level. Thus, since all the signals $A_1$, $A_2$, $B_1$, and $B_2$ are at Low level, the vibration wave motor stands still.

If a position command Po from a controller (not shown) is different from a position signal Ps from a position sensor (not shown), a DIR signal indicating a moving direction is set, and the $\overline{STOP}$ signal and the S signal are set at High level.

In the vibration wave motor of this embodiment, the piezoelectric elements 7 and 8 are arranged on a vibrating member. The elements 7 and 8 are applied with the secondary outputs from the transformers 5 and 6 to form travelling waves in the vibrating member, thereby pivoting a rotor urged against the vibrating member. The pivotal movement of the rotor controls the drive operation of a movable member, and the moving position of the movable member is detected by the position sensor.

Thus, upon comparison between the command Po indicating the target position and the signal Ps from the sensor indicating the current position, the signal DIR indicating the driving direction toward the target position is set to be 0 or 1.

When the $\overline{STOP}$ signal is set at High level, the $\overline{CLR}$ signal output from the OR gate 23 goes to High level, and the pulse generator 21 (FIG. 9) starts its operation. Thus, output pulses $A_1$, $A_2$, $B_1$, and $B_2$ are alternately and sequentially output from the pulse generator 21, as shown in FIG. 2, and the vibration wave motor begins to move. This operation is repeated until the position command Po and the position signal Ps become equal to each other. When the position command Po and the position signal Ps become equal to each other, the S signal is set at High level, and thereafter, the $\overline{STOP}$ signal is set at Low level. Thus, although the output pulses $A_1$, $A_2$, $B_1$, and $B_2$ are alternately generated because the $\overline{CLR}$ signal output from the OR gate 23 is still at High level, since the S signal is at High level, the motor is stopped, as described above. When the S signal is set at Low level after an elapse of a predetermined period of time, the $\overline{CLR}$ signal output from the OR Gate 23 Goes to Low level, and all the output pulses $A_1$, $A_2$, $B_1$, and $B_2$ go to Low level, thus restoring an initial state.

Figure 8:
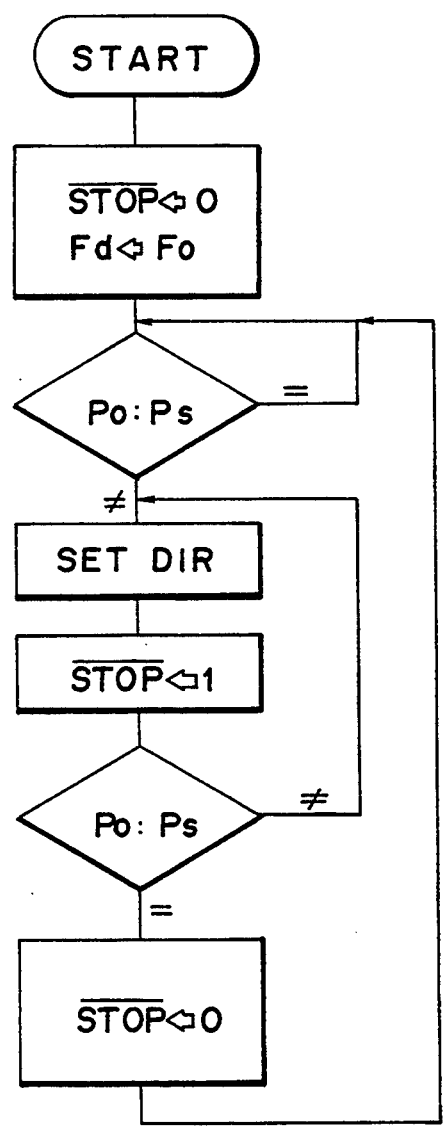
FIG. 8 is a flow chart showing an operation of the circuit shown in FIG. 7.

FIG. 7 shows another circuit arrangement for generating the signals $A_1$, $A_2$, $B_1$, $B_2$, and S. The circuit shown in FIG. 7 includes an AND Gate 22, an inverter 31, a piezoelectric element 24, arranged on the vibrating member, for detecting the vibration of the vibration wave motor, a capacitor 25 for voltage-dividing a voltage output from the piezoelectric element 24, a rectifying diode 26, and a low-pass filter constituted by a resistor 27 and a capacitor 28. The circuit also includes a Schmitt trigger input buffer 29. An output Vs from the low-pass filter is a DC voltage corresponding to the vibration amplitude of the vibration wave motor, and is increased as the amplitude becomes larger. With this arrangement, the buffer 29 outputs a High- or Low-level output, with to have a certain amplitude as a threshold level. Other elements and their arrangements are the same as those in FIG. 5, and a detailed description thereof will be omitted. FIG. 8 is a flow chart showing an operation of the CPU 30 shown in FIG. 7.

The operation of the circuit shown in FIG. 7 will be described below with reference to FIG. 8.

When a software program is started, a $\overline{STOP}$ signal is set at Low level, and the driving frequency of the vibration wave motor is set in Fd. At this time, since the vibration wave motor stands still, the output from the buffer 29 is at Low level. The signal S output from the AND gate 22 is at Low level, and the $\overline{CLR}$ signal output from the OR gate 23 is also at Low level. Therefore, since all the signals $A_1$, $A_2$, $B_1$, and $B_2$ are at Low level, and the signals $A_1'$, $A_2'$, $B_1'$, and $B_2'0$ shown in FIG. 1 are also at Low level, the vibration wave motor is kept stopped.

If the position command Po from the controller (not shown) is different from the position signal Ps! from the position sensor (not shown), the DIR signal indicating the moving direction is set, and the $\overline{STOP}$ signal is set at High level. Then, since the $\overline{CLR}$ signal output from the OR gate 23 goes to High level, and the S signal is still at Low level, the outputs $A_1$, $A_2'$, $B_1$, and $B_2$ are sequentially generated, as shown in FIG. 2, and the vibration wave motor starts a vibration. When the amplitude of the vibration exceeds a certain amplitude level, the output from the buffer 29 goes to High level. In this case, the $\overline{CLR}$ signal is kept at High level, and the S signal is kept at Low level. This operation is repeated until the vibration wave motor begins to move, and the position command Po and the position signal Ps become equal to each other. When the position command Po and the position signal Ps become equal to each other, the $\overline{STOP}$ signal is set at Low level. Then, the $\overline{CLR}$ signal output from the OR gate 23 is still at High level, and the S signal goes to High level. As described above, the vibration is immediately attenuated, and when the amplitude of a vibration becomes smaller than the certain vibration level, the output from the buffer 29 goes to Low level, and the $\overline{CLR}$ signal and the S signal go to Low level, thus restoring an initial state.

<Second Embodiment>

Figure 3:
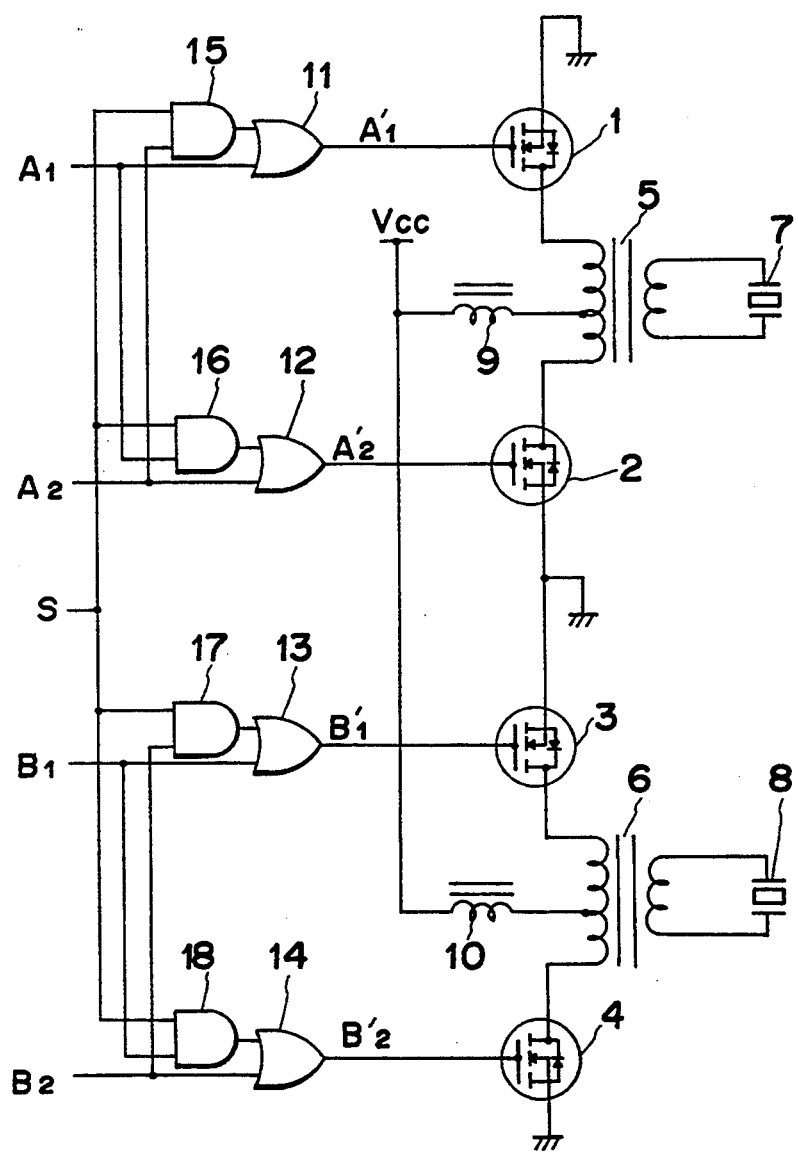
FIG. 3 is a circuit diagram showing a second embodiment.
Figure 4:
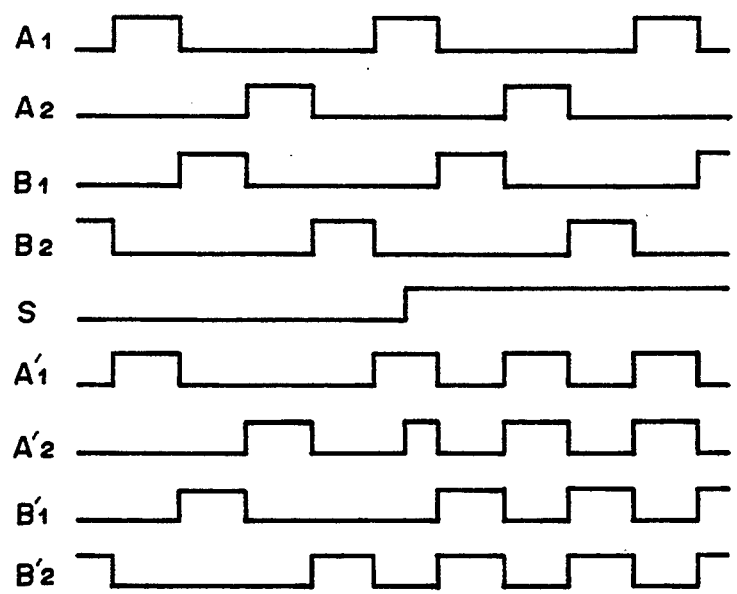
FIG. 4 is a timing chart of the circuit diagram shown in FIG. 3.

In the first embodiment, if the short-circuiting time is long, the MOSFETs may be destroyed. FIG. 3 is a circuit diagram showing an example for intermittently short-circuiting the MOSFETs in order to solve the problem of the first embodiment. The circuit shown in FIG. 3 includes AND gates 15, 16, 17, and 18. FIG. 4 shows waveforms of the respective circuit portions.

In the embodiment shown in FIG. 3, when an S signal is at High level, and an output pulse $A_1$ or $A_2$ is at High level, the AND gate 15 or 16 outputs a High-level signal, and signals $A_1'0$ and $A_2'$ go to High level; when an output pulse $B_1$ or $B_2$ is at High level, the AND gate 17 or 18 outputs a High-level signal, and signals $B_1'$ and $B_2'$ go to High level. Therefore, when the S signal goes to High level, the primary side of the transformer 5 or 6 is alternately and intermittently short-circuited.

As described above, in the driving circuits according to each of the above embodiments of the present invention, a circuit for consuming a virabation driving energy at high speed when the vibration wave motor is stopped is realized by adding a simple digital circuit to a conventional driving circuit, thus allowing high-precision positioning at low cost.

What is claimed is:

1. A vibration type actuator apparatus, which obtains a driving force by applying an AC signal to an electromechanical energy conversion element to generate vibration energy, comprising:
   a transformer, a secondary output of which is connected to said energy conversion element; and
   a control circuit connected to an inductance element of primary side of the transformer and operable in a first mode and a second mode, wherein, in the first mode, said control circuit alternately switches a direction of current flow in the inductance element, and wherein, in the second mode, said control circuit short-circuits the inductance element.

2. An apparatus according to claim 1, wherein said control circuit comprises first and second switching elements connected to the inductance element of the primary side of the transformer, and wherein, in the first mode, said control circuit switches the direction of current flow in the inductance element by alternately turning on the first and second switching elements, and wherein, in the second mode, the control circuit short circuits the inductance element by simultaneously turning on the first and second elements.

3. An apparatus according to claim 2, wherein, in the second mode, said control circuit intermittently and simultaneously turns on said first and second switching elements.

4. An apparatus according to claim 3, wherein said control circuit forms, with a predetermined period, an ON signal for simultaneously turning on said first and second switching elements, said predetermined period being set at substantially half a period for turning on said first switching element in the first mode.

5. An apparatus according to claim 2, wherein said control circuit transfers from the first mode to the second mode.

6. An apparatus according to claim 5, wherein, in the second mode, said control circuit simultaneously turns on the first and second elements and, after a predetermined time period, simultaneously turns off the first and second elements.

7. An apparatus according to claim 3, wherein said control circuit transfers from the first mode to the second mode, and thereafter transfers to a third mode, wherein said control circuit simultaneously turns off the first and second elements.

8. An apparatus according to claim 5, wherein, in the second mode, said control circuit simultaneously turns on the first and second elements, and thereafter simultaneously turns off the first and second elements when a vibration energy obtained by the electro-mechanical energy conversion element is equal to or smaller than a predetermined value.

9. An apparatus according to claim 7, wherein, in the second mode, said control circuit transfers to the third mode when a vibration energy obtained by the electro-mechanical energy conversion element is equal to or smaller than a predetermined value.

10. A vibration type actuator apparatus, which obtains a driving force by applying an AC signal to an electro-mechanical energy conversion element to generate vibration energy, comprising:
a transformer, a secondary output of which is connected to said energy conversion element;
a first switching element connected to one terminal of a primary coil of said transformer;
a second switching element connected to the other terminal of the primary coil;
a current circuit for forming a first current path for flowing a current to the primary coil via a center tap of the primary coil of said transformer when said first switching element is ON, and for forming a second current path for flowing a current to the primary coil via the center tap of the primary coil when said second switching element is ON,
wherein said first and second switching elements are simultaneously turned on to short-circuit the primary coil/and
a control circuit having first and second operative modes, wherein, in the first mode, said control circuit alternately and periodically turns on the first and second switching elements, and wherein, in the second mode, said control circuit simultaneously turns on the first and second switching elements.

11. An apparatus according to claim 10, wherein said control circuit intermittently and simultaneously turns on the first and second elements in the second mode.

12. An apparatus according to claim 10, wherein said control circuit transfers from the first mode to the second mode.

13. An apparatus according to claim 12, wherein, in the second mode, said control circuit simultaneously turns on the first and second elements and, after a predetermined time period, simultaneously turns off the first and second elements.

14. A vibration type actuator apparatus, which obtains a driving force by applying an A.C. signal to first and second electro-mechanical energy conversion elements to generate vibration energy, comprising:
a first transformer, a secondary output of which is connected to said first energy conversion element part;
a second transformer, a secondary output of which is connected to said second energy conversion element part; and
a control circuit having first and second operation modes for performing a mode shift from the first mode to the second mode,
wherein, in the first mode, said control circuit alternately switches a direction of current flow in an inductance element of a primary side of the first transformer and switches a direction of current flow in an inductance element of a primary side of the second transformer with a timing different from a timing of the switching of the direction of current flow in the inductance element of the first transformer, and
wherein, in the second mode, said control circuit simultaneously short-circuits the inductance elements of the first and second transformers.

* * * * *

UNITED STATES PATENT AND TRADEMARK OFFICE
CERTIFICATE OF CORRECTION

PATENT NO. : 5,436,521
DATED : July 25, 1995
INVENTOR(S) : KENICHI KATAOKA

It is certified that error appears in the above-indentified patent and that said Letters Patent is hereby corrected as shown below:

Title page,
At [56] Foreign Patent Documents

"02206373 8/1990 Japan" should read --2-206373 8/1990 Japan--.

Column 1

Line 8, "1. Related" should read --2. Related--.
Line 23, "In," should read --In--.
Line 29, "transformer;" should read --transformer.--
Line 34, "of" should be deleted.
Line 56, "circuit;" should read --circuit--.
Line 58, "circuit:" should read --circuit--.

Column 2

Line 13, ")R" should read --OR--.
Line 33, "signals $A_1'$, $A_2'$," should read --signals $A_1$, $A_2$,--.
Line 34, "$B_1'$, $B_2'$," should read --$B_1$, $B_2$,--.

UNITED STATES PATENT AND TRADEMARK OFFICE
CERTIFICATE OF CORRECTION

PATENT NO. : 5,436,521

DATED : July 25, 1995

INVENTOR(S) : KENICHI KATAOKA

It is certified that error appears in the above-indentified patent and that said Letters Patent is hereby corrected as shown below:

Column 3

Line 15, ",equal" should read --equal--.
Line 41, "to have" should be deleted.
Line 56, "$B_2'O$" should read --$B_2'$--.
Line 60, "signal Ps!" should read --signal Ps--.
Line 65, "$A_2',$" should read --$A_2,$--.

Column 4

Line 27, "signals $A_1'O$" should read --signals $A_1'$--.
Line 35, "virabration" should read --vibration--.

Column 6

Line 5, "coil/and" should read --coil; and--.

Signed and Sealed this

Twenty-fourth Day of October, 1995

Attest:

BRUCE LEHMAN

Attesting Officer        Commissioner of Patents and Trademarks